United States Patent

[11] 3,617,913

[72] Inventors Rolf Schmidhauser
Palo Alto;
S. Cameron Reid, Mountain View, both of Calif.
[21] Appl. No. 757,206
[22] Filed Aug. 15, 1968
[45] Patented Nov. 2, 1971
[73] Assignee Data Technology Corporation
by said Rolf Schmidhauser

[54] CHOPPER STABILIZED DC AMPLIFIER
3 Claims, 4 Drawing Figs.

[52] U.S. Cl. .......... 330/9, 330/51, 330/75
[51] Int. Cl. .......... H03f 1/02, H03f 1/36
[50] Field of Search .......... 330/51, 9

[56] References Cited
UNITED STATES PATENTS
2,744,969 5/1956 Peterson .......... 330/9

*Primary Examiner*—Nathan Kaufman
*Attorney*—Lowhurst & Hamrick

ABSTRACT: A chopper stabilized DC amplifier including a capacitive memory unit and a pair of alternately connected feedback loops. When the first loop is connected, one side of the capacitor is charged to a voltage $V_{off}$ which is equal in magnitude to the drift voltage of the amplifier, and the other side is charged to the input voltage $V_{in}$ such that the charge across the capacitor equals $V_{in}-V_{off}$. When the first loop is disconnected and the other loop is connected to the other side of the capacitor, the output voltage $V_{out}$ of the amplifier is driven equal to $V_{in}$ as the amplifier attempts to maintain $V_{off}$ equal to the amplifier drift. At a duty cycle of 100 to 1 a chain of pulses is produced, the amplitudes of which are equal to the instantaneous value of the input signal and are completely independent of any drift in the amplifier.

INVENTORS:
S. CAMERON REID
ROLF SCHMIDHAUSER
BY
Harvey G. Lowhurst
ATTORNEY

CHOPPER STABILIZED DC AMPLIFIER

STATEMENT OF THE INVENTION

The present invention relates generally to DC amplifiers, and, more particularly, to high input impedance, chopper stabilized buffer amplifiers of the type typically used in the input section of analog-to-digital conversion apparatus.

DISCUSSION OF THE PRIOR ART

It has long been recognized that time varying DC voltages and currents can be amplified using DC amplifiers. Such circuits have for many years been used extensively in computers, data-conversion apparatus, DC voltmeters, oscilloscope deflection amplifiers and in many electronic instrumentation applications. These circuits, however, are subject to many disadvantages most of which result from amplifier drift.

As the circuit components age, their electrical and temperature dependence characteristics tend to vary somewhat. Likewise, the output levels of the rectified power supplies which supply the biasing potentials normally change with time. Even the operating characteristics of the amplifying element itself, be it tube or semiconductor, can change slightly with time. And, since any change in the operating parameters of any stage of the amplifier is amplified by each successive stage, and, since it is usually the voltage level of the output signal which is utilized as the sole indicia of the input data, the DC amplifier is wholly unreliable for most uses unless means are provided for compensating for any drift which occurs.

The prior art is replete with methods for correcting and/or compensating for drift in the DC amplifier. An early method was to use highly regulated power supplies and precision circuit components. Another was to use balanced amplifying circuits. Still another method was to use circuits with degenerative feedback. Popular among the recent prior art methods is the use of a "memory" element at the input to the amplifier.

Notable among the "memory" type apparatus are the circuits disclosed in the U.S. Pat. Nos. to Molloy No. 2,970,266 and Staunton No. 3,265,979. These types of circuits, however, suffer certain functional disadvantages in that the input signal to the amplifier must be periodically interrupted in order to perform the drift correction operation and the feedback circuitry requires at least two switching units. But, since "memory" type drift correction circuitry of various configurations have generally been accepted as the most practical solution to the drift problem in DC amplifiers, we have now provided apparatus of this general type which includes certain improvements for overcoming the disadvantages of the prior art.

OBJECTS OF THE INVENTION

It is therefore a principle object of the present invention to provide a novel chopper stabilized high input impedance DC amplifier which overcomes the disadvantages of prior art apparatus.

Another object of the present invention is to provide a novel DC amplifier having means for eliminating inherent instabilities resulting from component drift.

Still another object of the present invention is to provide a novel drift-free DC amplifier which is relatively inexpensive and requires a minimum of operative elements in the drift correction circuitry.

A still further object of the present invention is to provide a drift-free high-impedance chopper stabilized buffer amplifier having particular utility as an input amplifier for analog-to-digital conversion apparatus.

Other objects and advantages of the present invention will become apparent after a reading of the following specification considered together with the preferred embodiment illustrated in the drawing wherein:

DESCRIPTION OF THE PREFERRED EMBODIMENT

Figure 1:
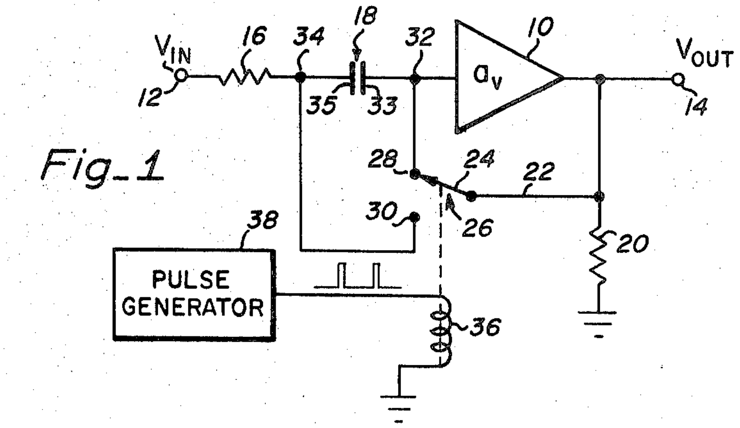
FIG. 1 is a schematic illustration of a preferred embodiment of the invention.

Referring now to FIG. 1 of the drawing, a simplified version of a preferred embodiment of the invention will be described. A DC amplifier 10 having voltage gain $a_v$ is shown having an input terminal 12 and an output terminal 14. Although shown as a single stage, amplifier 10 can likewise be taken to represent a multistage DC amplifying unit. The input terminal 12 is coupled to amplifier 10 through a high impedance resistor 16 and a storage capacitor 18. Resistance 16 is typically of a very large value so as to insure that the circuit offers a high input impedance at terminal 12. The input impedance $R_{in}$ of the circuit may be determined in accordance with the expression:

$$R_{in}=a_vR/\delta \text{where}$$

$a_v$ is the voltage amplification factor of the amplifier 10,
$R$ is the resistance of input resistance 16, and
$\delta$ is the duty cycle of the switch 26 to be described below.

Typical values of $R_{in}$ for a circuit such as is shown in FIG. 1 are in the neighborhood of 10,000 megohms.

The output of amplifier 10 appearing at output terminal 14 is taken across a load resistor 20. A lead 22 is also connected to the output of amplifier 10, and provides a feedback path to the arm 24 of a double-throw switch 26, the arm 24 being selectively positionable to contact either of the terminals 28 or 30. The terminal 28 is connected to a point 32 in the circuit connecting plate 33 of the capacitor 18 to the amplifier 10. Terminal 30 is likewise connected to a point 34 in between the resistor 16 and plate 35 of capacitor 18.

In the illustrative embodiment of FIG. 1, the switch 26 is provided with an actuating solenoid 36 which is energized by a pulse generator 38. The output of the pulse generator 38 is preferably chosen so as to present a continuous train of pulses of short duration to the solenoid 36 for periodically causing the arm 24 of switch 26 to be alternately switched between terminals 28 and 30. Ideally, the duty cycle of the switch 26 is about 100 to 1 in favor of the terminal 28 position as shown, i.e., the arm 24 is positioned to contact terminal 30 only about 1/100 of the time between successive actuations.

Figure 2:
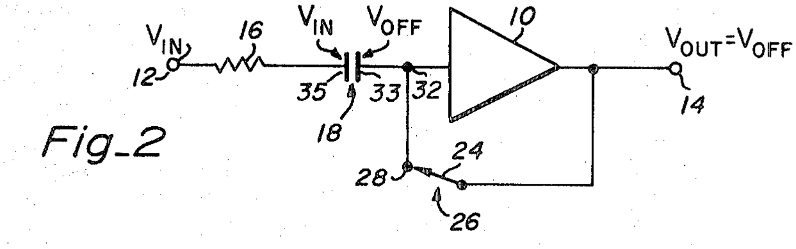
FIG. 2 illustrates one operative state of the embodiment of FIG. 1.
Figure 3:
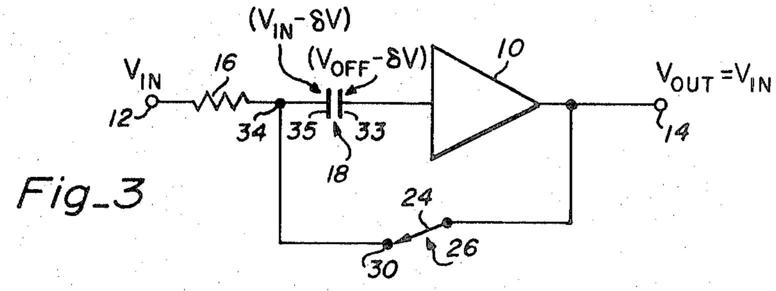
FIG. 3 illustrates another operative state of the embodiment of FIG. 1.
Figure 4:
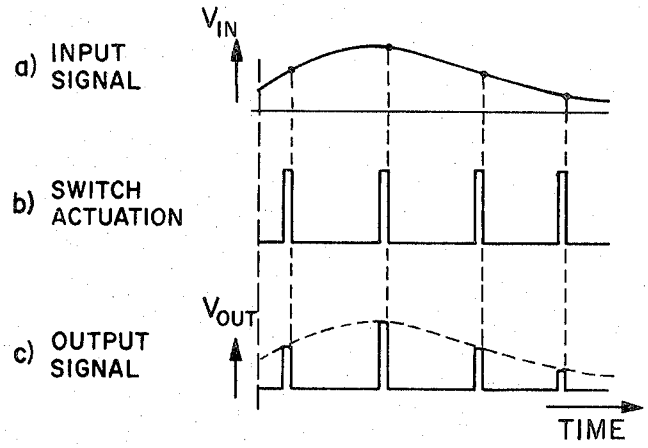
FIG. 4 is a signal diagram graphically illustrating the function of the embodiment of FIG. 1.

The operation of the above-described amplifying circuit can be illustrated by referring to FIGS. 2, 3 and 4. In FIG. 2, the switch 26 is shown in its primary position and feeds the output of amplifier 10 back to point 32 on the amplifier side of capacitor 18. With no drift in the amplifier 10, the point 32 is maintained at zero volts since plate 33 of capacitor 18 is not initially charged. However, should the amplifier 10 begin to experience drift, an output responsive to such drift will momentarily appear at output 14 and be fed back to the input circuit as shown. This drift signal causes plate 33 of capacitor 18 to be charged to a voltage $V_{off}$ which is equal in magnitude to the drift voltage and, since the feedback is 100 percent (and is negative), the output of amplifier 10 is at $V_{off}$, and thereafter is held at zero notwithstanding any subsequent amplifier drift.

Since $V_{in}$ is a slowly varying DC voltage, the charge on plate 35 of capacitor 18 will be raised to $V_{in}$ such that the net voltage across the capacitor 18 is equal to $V_{in}-V_{off}$. So long as switch 26 remains in contact with terminal 28, this relationship will hold even though either or both of $V_{in}$ and $V_{off}$ may vary. Furthermore, $V_{out}$ will be maintained at $V_{off}$ due to the negative feedback through switch 26.

If arm 24 of switch 26 is now caused to break from terminal 28 and is caused to contact terminal 30, as shown in FIG. 3, the drift compensating charge on plate 33 of capacitor 18 is no longer sustained by the feedback loop, and begins to slowly discharge through the input resistance of amplifier 10. However, as this occurs the charge on plate 33 no longer precisely matches the amplifier drift voltage, and, since any change in $V_{off}$, which is actually the input voltage to amplifier 10, is amplified $a_v$ times, $V_{out}$ rapidly starts to rise in attempting to maintain the amplifier input at $V_{off}$. But since the feedback circuit is now connected to the other side of the capacitor 18 and the feedback signal is opposite in sign to the voltage $V_{in}$ on plate 35, the effect is to drive the voltage on plate 35 towards zero volts.

Consequently, the voltage $V_{out}$ at terminal 14 must move towards the voltage $V_{in}$. And because every change in output voltage $V_{out}$ requires an $a_v$ times smaller change $\delta V$ in the input signal to amplifier 10, the voltage on plate 33 of the capacitor 18 has only changed slightly by the time $V_{out}$ has approached $V_{in}$ in magnitude. Assuming that $a_v$ is high, which is true for most presently available operational amplifiers ($a_v$>1 0,000), the voltage change $\delta V$ on capacitor plate 33 can be neglected.

Therefore, since the previously described operation takes place almost instantaneously, the capacitor 18 cannot discharge and the charge on plate 35 will remain substantially equal to $V_{in}$ and the output voltage $V_{out}$ will likewise be equal to the input voltage $V_{in}$, wholly independent of any amplifier drift, for substantially the entire period that the arm 24 of switch 26 is in contact with terminal 30 to thereby connect the feedback loop to the input side 35 of capacitor 18. When the switch is returned to its terminal 28 position, the output is again driven to $V_{off}$, plate 35 is raised to $V_{in}$ and plate 33 is brought back to $V_{off}$ which is equal to the amplifier drift at that instant in time.

When the switch 26 is again energized, the same sequence of events occurs and another output pulse $V_{out}$, equal to $V_{in}$, will be produced as is depicted in part (c) of FIG. 4. Thus, the amplifier is caused to accurately reproduce, in response to a time varying DC input, a pulsed DC output which is completely unaffected by any drift condition which might occur in the amplifier per se.

This novel drift correction apparatus is particularly suited for use in analog-to-digital conversion apparatus wherein the analog signal is only required for a portion of the conversion cycle. Furthermore, the subject invention provides a relatively simple and inexpensive, yet dependable DC amplifying means for use in inexpensive dual-slope analog-to-digital conversion devices while at the same time overcoming certain disadvantages of the prior art apparatus.

Whereas the above-described apparatus represents a preferred embodiment of the present invention, it will be apparent that many additions and modifications can be made to the particular illustrative embodiment disclosed herein without departing from the scope of the invention. It is therefore to be understood that we intend for the appended claims to be interpreted in accordance with the true spirit and scope of the invention and not to be limited by the particular embodiment disclosed.

What is claimed is:

1. A stabilized DC amplifying apparatus comprising:
input circuit means for receiving a DC signal to be amplified;
amplifier means having an input terminal and an output terminal;
storage capacitor means having a first plate directly coupled to said input circuit means and a second plate directly coupled to said input terminal;
first circuit means directly connected to said first plate;
second circuit means directly connected to said second plate;
switch means directly connected to said output terminal for selectively connecting one of said first and second circuit means to said output terminal; and
switch-activating means for causing said switch means to alternately connect said first circuit means to said output terminal for a first predetermined period of time whereby the output of said amplifier means is driven to a predetermined fixed reference, and said second circuit means to said output terminal for a second predetermined period of time whereby the output of said amplifier means is caused to generate an output signal proportional to said DC signal.

2. A chopper stabilized DC amplifier apparatus for converting a DC input signal into a series of output pulses having amplitudes proportional to the instantaneous value of said input signal, and apparatus comprising:
input circuit means for receiving said DC input signal;
amplifier means having an input terminal and an output terminal;
storage capacitor means having a first plate directly connected to said input circuit means and a second plate directly connected to said amplifier input terminal;
first circuit means connecting said first plate to a first switch contact means;
second circuit means connecting said second plate to a second switch contact means;
double throw switch means including said first and second contact means and a switching arm directly coupled to said output terminal for alternately completing a feedback circuit to one of said plates by contacting one of said first and second contact means; and
switch-actuating means for causing said switching arm to alternately engage said first and second contact means for predetermined periods of time causing said amplifier means to generate an output pulse having an amplitude proportional to said DC input signal each time said switching arm contacts said first contact means and to generate an output of a predetermined reference potential each time said switching arm contacts said second contact means, the amplitudes of said output pulses being unaffected by any drift occurring in said amplifier means.

3. A chopper stabilized DC amplifier apparatus as recited in claim 2 wherein said switch actuating means causes said switching arm to be positioned at said second contact means for substantially longer periods than at said first contact means and said switching arm is caused to be switched between said first and second contact means at a rate of many times per second.

* * * * *